United States Patent
Hirota et al.

(10) Patent No.: US 7,713,159 B2
(45) Date of Patent: *May 11, 2010

(54) POWER TRANSMITTING APPARATUS

(75) Inventors: Isao Hirota, Tochigi (JP); Norihiko Tashiro, Tochigi (JP)

(73) Assignee: GKN Driveline Torque Technology KK, Tochigi-ken (JP)

( * ) Notice: Subject to any disclaimer, the term of this patent is extended or adjusted under 35 U.S.C. 154(b) by 508 days.

This patent is subject to a terminal disclaimer.

(21) Appl. No.: 11/732,147

(22) Filed: Apr. 3, 2007

(65) Prior Publication Data
US 2007/0238567 A1    Oct. 11, 2007

(30) Foreign Application Priority Data
Apr. 10, 2006 (JP) .............................. 2006-107061

(51) Int. Cl.
*F16H 48/20* (2006.01)
(52) U.S. Cl. .................................................... 475/249
(58) Field of Classification Search ........................ None
See application file for complete search history.

(56) References Cited

U.S. PATENT DOCUMENTS

| | | | |
|---|---|---|---|
| 1,979,414 A | | 11/1934 | Smith |
| 4,836,051 A | * | 6/1989 | Guimbretiere ............... 475/85 |
| 5,547,430 A | * | 8/1996 | Gasch ........................ 475/89 |
| 5,556,350 A | * | 9/1996 | Madsack ..................... 475/85 |
| 7,390,278 B2 | * | 6/2008 | Krisher ....................... 475/231 |
| 2005/0026732 A1 | * | 2/2005 | Krisher et al. ................ 475/86 |
| 2009/0008207 A1 | * | 1/2009 | Hirota et al. ............. 192/70.12 |

FOREIGN PATENT DOCUMENTS

| | | |
|---|---|---|
| DE | 37 38 280 A1 | 6/1989 |
| DE | 39 12 304 A1 | 10/1990 |
| EP | 0 265 297 A1 | 4/1988 |
| EP | 0 511 068 A1 | 10/1992 |
| EP | 0 548 853 A1 | 6/1993 |
| EP | 1 502 800 A1 | 2/2005 |
| GB | 2 235 502 A | 3/1991 |
| JP | 10-19108 | 1/1998 |

OTHER PUBLICATIONS

Patent Abstracts of Japan for Japanese Publication No. 10-019108, Publication date Jan. 23, 1998 (1 page).
German Office Action for Application No. 10 2007 016 599.6-12, mailed on Feb. 11, 2009 (6 pages).

* cited by examiner

*Primary Examiner*—Dirk Wright
(74) *Attorney, Agent, or Firm*—Osha • Liang LLP

(57) ABSTRACT

A differential mechanism 3 is contained and supported at inside of a bell housing 7 integrally provided to a transmission case 11 of a transmission 9 to constitute a common lubrication environment. A limited slip differential mechanism 5 for limiting differential movement of the differential mechanism 3 is made to be selectively attachable to outside of the bell housing 7. The limited slip differential mechanism 5 is not restricted by a size of the bell housing 7, the sufficient limited slip differential mechanism 5 can be provided, and an interchangeability of presence/absence of the limited slip differential mechanism 5 can be provided.

6 Claims, 12 Drawing Sheets

POWER TRANSMITTING APPARATUS

This application claims foreign priority from Japanese Patent Application No. 2006-107061, filed on Apr. 10, 2006, the entire contents of which are hereby incorporated by reference.

BACKGROUND OF THE INVENTION

1. Field of the Invention

The present invention relates to a power transmitting apparatus including a differential mechanism.

2. Related Art

JP-A-10-019108 discloses a power transmitting apparatus including a differential mechanism provided with a limited slip differential mechanism. According to the power transmitting apparatus, since both of the differential mechanism and the limited slip differential mechanism are arranged at inside of a differential case, the power transmitting apparatus tends to be large-sized as a whole.

Therefore, it is difficult to provide the limited slip differential mechanism having a sufficient performance in a limited space, for example, an inside of a so-to-speak bell housing integrally provided to a transmission case or the like where the limited slip differential mechanism is arranged as a front differential mechanism.

Further, when the bell housing is designed to be small in conformity with a size of a normal differential mechanism which is not provided with the limited slip differential mechanism for light-weighted formation of a vehicle or the like, there poses a problem that a differential mechanism including the limited slip differential mechanism cannot be arranged and an interchangeability is lost.

That is, in the conventional art, since both of the differential mechanism and the limited slip differential mechanism are arranged at inside of the differential case, it is difficult to arrange the limited slip differential mechanism having the sufficient performance within the limited space of the housing. Further, when the housing is designed in conformity with a size of a normal differential mechanism which is not provided with the limited slip differential mechanism, the differential mechanism including the limited slip differential mechanism cannot be arranged and an interchangeability is lost.

SUMMARY OF THE INVENTION

One or more embodiments of the present invention provide a power transmitting apparatus in which a differential mechanism is contained and supported at inside of a housing integrally provided with a transmission case of a transmission to constitute a common lubrication environment and a limited slip differential mechanism for limiting a differential movement of the differential mechanism is capable of selectively being attached to outside of the housing, so as to provide a sufficient limited slip differential mechanism to the differential mechanism arranged in the housing having a limited space and provide an interchangeability of presence/absence of the limited slip differential mechanism.

According to the one or more embodiments of the invention, since the differential mechanism is contained and supported at inside of the housing integrally provided to the transmission case of the transmission to constitute the common lubrication environment and the limited slip differential mechanism for limiting the differential movement of the differential mechanism is made to be able to be selectively attached to outside of the housing, the limited slip differential mechanism is not restricted by the size of the housing, and the sufficient limited slip differential mechanism can be provided. Further, the limited slip differential mechanism is made to be selectively attachable, and therefore, the interchangeability of presence/absence of the limited slip differential mechanism can be provided.

Other aspects and advantages of the invention will be apparent from the following description and the appended claims.

DESCRIPTION OF REFERENCE NUMERALS AND SIGNS

Figure 1:
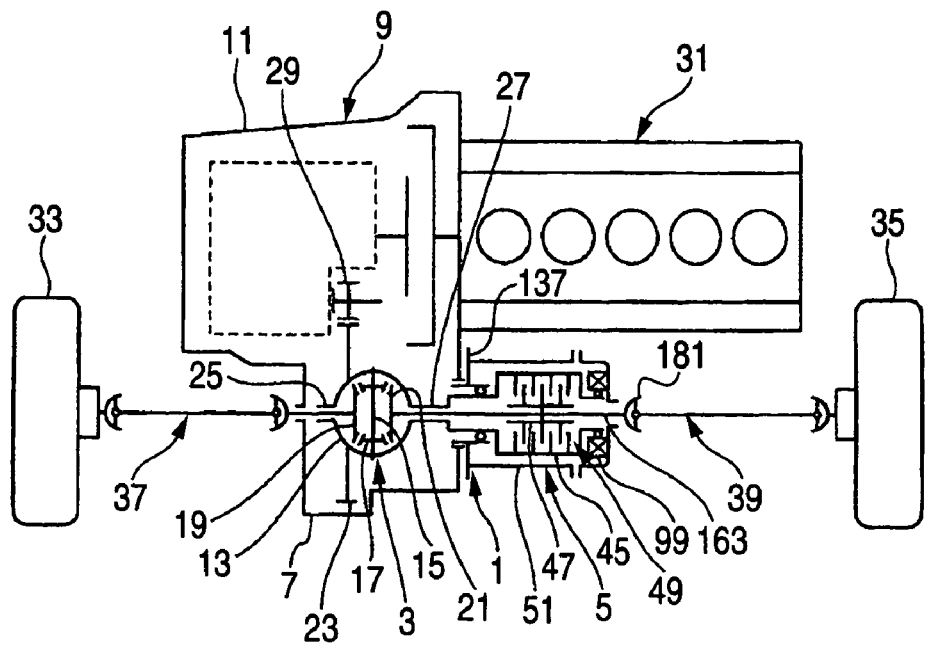
FIG. 1 is a skeleton view of a transversal front engine front drive (FF) vehicle to which a power transmitting apparatus of an exemplary embodiment 1 is applicable.
Figure 1:

1 ... power transmitting apparatus
3 ... differential mechanism
5 ... limited slip differential mechanism
7 ... bell housing (housing)
9 ... transmission
11 ... transmission case
13 ... differential case
39 ... axle
45 ... clutch housing (outer rotating member)
47 ... clutch hub (inner rotating member)
49 ... clutch portion
55 ... inner spline (engaging portion)
99 ... electromagnet

DETAILED DESCRIPTION OF THE EXEMPLARY EMBODIMENTS

According to exemplary embodiments of the invention, by enabling to selectively attach a limited slip differential mechanism to outside of a housing, it is realized to provide a sufficient limited slip differential mechanism to a differential mechanism contained in the housing having a limited space and provide an interchangeability of presence/absence of the limited slip differential mechanism.

Exemplary Embodiment 1

[Power Transmitting Apparatus]

FIG. 1 is a skeleton view of a transversal front engine front drive (FF) vehicle, to which a power transmitting apparatus of an exemplary embodiment 1 can be applicable.

As shown by FIG. 1, a power transmitting apparatus 1 includes a differential mechanism 3 and a limited slip differential mechanism 5.

The differential mechanism 3 is contained and arranged at inside of a so-to-speak bell housing 7. The bell housing 7 constitutes a housing integrally provided to a transmission case 11 of a transmission 9 to constitute a common lubrication environment. The bell housing 7 is dividedly constituted to the transmission case 11 and is integrally coupled thereto by a fastener of bolts and nuts and the like. The transmission case 11 and the bell housing 7 may be constructed by the integral constitution so far as the common lubrication environment is constituted.

According to the differential mechanism 3, a pinion gear 17 is rotatably supported by a pinion shaft 15 at inside of a differential case 13, and left and right side gears 19, 21 are brought in mesh with the pinion gear 17.

The differential case 13 includes a ring gear 23, boss portions 25, 27, the boss portions 25, 27 are rotatably supported by the bell housing 7 by bearings. The ring gear 23 is brought in mesh with an output gear 29 of the transmission 9. The transmission 9 is coupled to a transversal engine 31.

The left and right side gears, 19, 21 are coupled with left and right axles 37, 39 of front wheels 33, 35 of an automobile by splines as output shafts.

Therefore, there is constructed a constitution of transmitting a torque transmitted from the engine 31 by way of the transmission 9 differentially rotatably to the pair of wheels 33, 35 by the differential mechanism 3. Left and right rear wheels 41, 43 constitute driven wheels.

The limited slip differential mechanism 5 enables to limit a differential movement of the differential mechanism 3 and is made to be attachable to outside of the bell housing 7 by selective mounting. The limited slip differential mechanism 5 is subsidiarily assembled to a side of the axle 39 attachable/detachable to and from the differential mechanism 3.

The limited slip differential mechanism 5 includes a clutch portion 49 for generating a differential movement limiting force between a clutch housing 45 and a clutch hub 47 constituting inner and outer rotating members. The clutch housing 45 constituting one of the inner and outer rotating members is provided with an engaging portion to be rotationally engageable to the boss portion 27 of the differential case 13 of the differential mechanism 3 by being integrated thereto by being moved in an axial direction. The clutch hub 47 constituting other of the inner and outer rotating members is rotationally engaged to a side of the axle 39. The clutch portion 49 is made to be able to be controlled to fasten by an externally controllable electromagnetic force. The limited slip differential mechanism 5 is provided with a support housing 51 for being supported by the bell housing 7 attachably and detachably thereto and therefrom.

[Limited Slip Differential Mechanism]

Figure 2:
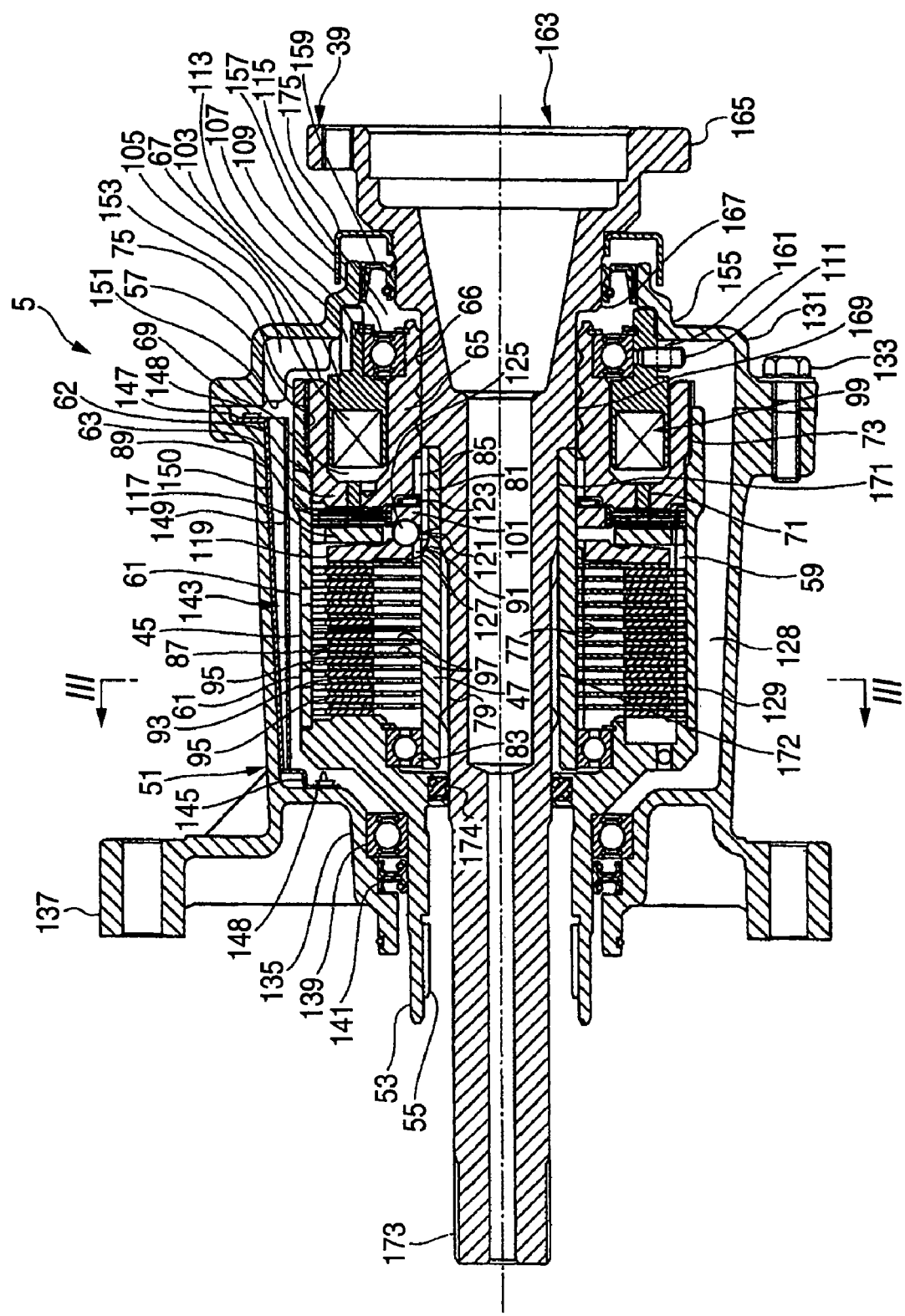
FIG. 2 is a sectional view of a limited slip differential mechanism (exemplary embodiment 1).

FIG. 2 is a sectional view of the limited slip differential mechanism according to exemplary embodiment 1 of the invention.

The clutch housing 45 is provided with a connecting cylinder portion 53 at one end thereof, the connecting cylinder portion 53 is provided with an inner spline 55 as the engaging portion. An inner periphery of other end of the clutch housing 45 is provided with a female screw portion 57. An inner periphery of the clutch housing 45 is provided with an inner spline 59 for a main clutch and a pilot clutch and is formed with a plurality of oil holes 61 in a radius direction for communicating inside and outside of the clutch housing 45 at a plurality of portions in an axial direction and at predetermined intervals in a peripheral direction. The inner spline 59 of the clutch housing is constructed by a constitution in which one tooth amount is deficient, and a plurality of teeth are deficient in the peripheral direction at the portion provided with the oil hole 61.

The clutch housing 45 is attached with a rotor 62. The rotor 62 is formed with a rotor main body portion 63 in a shape of a vertical wall, a boss portion 65 formed on an inner peripheral side of a back face of the rotor main body portion 63, and an outer cylinder portion 67 formed on an outer peripheral side thereof. A containing space portion 69 is provided between the boss portion 65 and the outer cylinder portion 67 on a side of the back face of the rotor main body portion 63.

The rotor main body portion 63 is provided with a nonmagnetic portion 71 between the boss portion 65 and the outer cylinder portion 67. The boss portion 65 is provided with a screw groove 66 at an inner peripheral face thereof. An outer peripheral face of an end portion of the outer cylinder portion 67 is provided with a male screw portion 73. By screwing the male screw portion 73 to the female screw portion 57 of the clutch housing 45, the rotor 62 is fixed to the clutch housing 45. An end portion of the male screw portion 73 is fastened with a nut 75 to prevent the rotor 62 from being loosened relative to the clutch housing 45.

The clutch hub 47 is formed to be hollow. The clutch hub 47 is provided with a spline 77 and an inner spline 79. An outer periphery on one side of the clutch hub 47 is provided with a plurality of grooves 81 along the axial direction at predetermined intervals in the peripheral direction. One end of the groove 81 is communicated with a screw groove 66 of the rotor 62. The clutch hub 47 is rotatably supported by the side of the clutch housing 45 by a bearing 83, and rotatably supported by the side of the rotor 62 by a copper ring (bush) 85 of a nonmagnetic member.

The clutch portion 49 is provided with a main clutch 87 and a pilot clutch 89 and pressing means 91.

The main clutch 87 is interposed between the clutch housing 45 and the clutch hub 47 for adjusting a differential movement limiting force by providing and releasing a press force. The main clutch 87 is constituted by a friction multiplates clutch, including pluralities of sheets of inner plates 93 and outer plates 95, twos of the plates 93, 95 are alternately arranged. The inner plate 93 is coupled by a spline of the spline 77 of the clutch hub 47. The outer plate 95 is coupled by a spline of the inner spline 59 of the clutch housing 45. The inner plate 93 is formed with a plurality of holes 97 in the peripheral direction on an inner peripheral side, the respective holes 97 of the inner plates 93 contiguous to each other are opposed to each other in the axial direction to form a path.

The pilot clutch 89 causes to fasten the main clutch 87 and is fastened by an operation of an electromagnet 99 as an actuator. The pilot clutch 89 includes pluralities of pieces of inner plates and outer plates and twos of the plates are alternately arranged. The inner plate is engaged by a spline to an outer periphery of a cam plate 101 of the pressing means 91, and the outer plate is engaged by a spline with the inner spline 59 of the clutch housing 45.

The electromagnet 99 is arranged at the containing space portion 69. The electromagnet 99 generates an electromagnetic force in accordance with a current control and is constituted by supporting a coil 105 by a support member 103. The support member 103 is provided with a support cylinder portion 107, and an inner peripheral side of the support cylinder portion 107 is relatively rotatably supported by an outer periphery of the boss portion 65 of the rotor 62 by way of a seal bearing 109. The support cylinder portion 107 is fixed with a pin 111 for preventing rotation. The support cylinder portion 107 is provided with a notch 113 from an outer periphery thereof over to an end face thereof. One end of the notch is communicated with one end of the screw groove 66 of the rotor 62 as the clutch housing 45 by a space portion 115 formed on a backside of the seal bearing 109.

Further, the electromagnet 99 is electrically connected to a power source and a controller on a vehicle body side by way of a harness.

The electromagnet 99 is arranged with an armature 117 contiguously to the pilot clutch 89 to interpose the rotor main body portion 63 and the pilot clutch 89. The armature 117 is engaged by a spline with the inner spline 59 of the clutch housing 45. The armature 117 is movable to the side of the rotor 62 to fasten the pilot clutch 89 by being attracted by a magnetic force of the electromagnet 99.

The pressing means 91 comprises the cam plate 101 and the press plate 119, and a cam mechanism 121 between the cam plate 101 and the press plate 119.

The back face side of the cam plate 101 is brought into contact with the side of the rotor 62 by way of a needle bearing 123. A plurality of cam balls 125 in the peripheral direction are interposed between cam faces of the cam plate 101 of the press plate 119. The cam face is constituted as a mounting shape, repeating mountains and valleys in the peripheral direction at respective faces of the cam plate 101 and the press plate 119 opposed to each other. The cam mechanism 121 is constituted by the cam faces and the respective cam balls 125. The press plate 119 is engaged by a spline with the spline 77 of the clutch hub 47. An inner periphery of the press plate 119 is provided with a plurality of notches 127 in the peripheral direction. The notch 127 is for communicating the groove 81 of the clutch hub 47 and the side of the main clutch 87.

The support housing 51 comprises a main body portion 129 and a cover portion 131, and surrounds the side of the clutch housing 45 by providing a space portion 128. The main body portion 129 and the cover portion 131 are coupled to fasten by a bolt 133.

The main body portion 129 is provided with a clutch support portion 135 and a coupling flange 137. The clutch housing 45 is rotatably supported by the clutch support portion 135 by way of a seal bearing 139, and on a back side of the seal bearing 139, an oil seal 141 is interposed between the clutch support portion 135 and the connecting cylinder portion 53.

An oil girder 143 is attached to an inner periphery of an upper portion of the main body portion 129.

Brackets 145, 147 for attaching end portions of the oil girder 143 are fastened to be fixed to the main body portion 129 by screws 148. At the oil girder 143, in a section of FIG. 2, a lower wall portion 149 is formed in parallel with an axis center of the axle 39, an upper wall 150 is inclined along the support housing 51 and the oil girder 143 is formed to be wide in a width thereof in an up and down direction on the side of the cover portion 131 relative to an opposed side. Therefore, there is constructed a constitution in which a lubricating oil rotated by being dragged by relative rotation of the outer peripheral face of the clutch housing 45 and the inner peripheral face of the main body portion 129 is guided to inside of the oil girder 143 to be easy to move to the side of the cover portion 131 by the inclination of the upper wall 150.

The cover portion 131 is formed with a guide recess portion 153 by a pair of ribs 151, one end of the guide recess portion 153 is opposed to one end portion of the oil girder 143, and other end thereof faces an upper portion of the notch 113 on the side of the electromagnet 99. The cover portion 131 is further provided with a fitting portion 155 and the boss portion 57, the support cylinder portion 107 of the electromagnet 99 is fitted to the fitting portion 155, and an oil seal 159 is interposed between the boss portion 157 and the axle 39, and the space portion 115 is formed. An inner face of the cover portion 131 is provided with a projected portion 161 to be engaged with the pin 111 of the electromagnet 99 to thereby prevent rotation.

The axle 39 is provided with a coupling shaft 163 for subsidiarily assembling the limited slip differential mechanism 5. The coupling shaft 163 is formed by a stepped shape, and is provided with a coupling flange 165, a first, a second, a third step portion 167, 169, 171. Splines 172, 173 are provided at front ends of the third step portion 167 and the axle.

The spline 172 of the axle 39 is fitted by a spline with the inner spline 79 of the clutch hub 47, and an oil seal 174 supported by the side of the clutch housing 45 is brought into contact with an end portion on the side of the third step portion 171. Further, the oil seal 174 constitutes a section thereof in an X-like shape and is suitable as a seal member under high temperature, high pressure condition. The second step portion 169 of the axle 39 is loosely fitted to the inner periphery of the screw groove 66 of the rotor 62, and the oil seal 159 is brought into contact with the first step portion 167. The first step portion 167 is attached with a dust cover 175 on an outer side of the oil seal 159.

Figure 3:
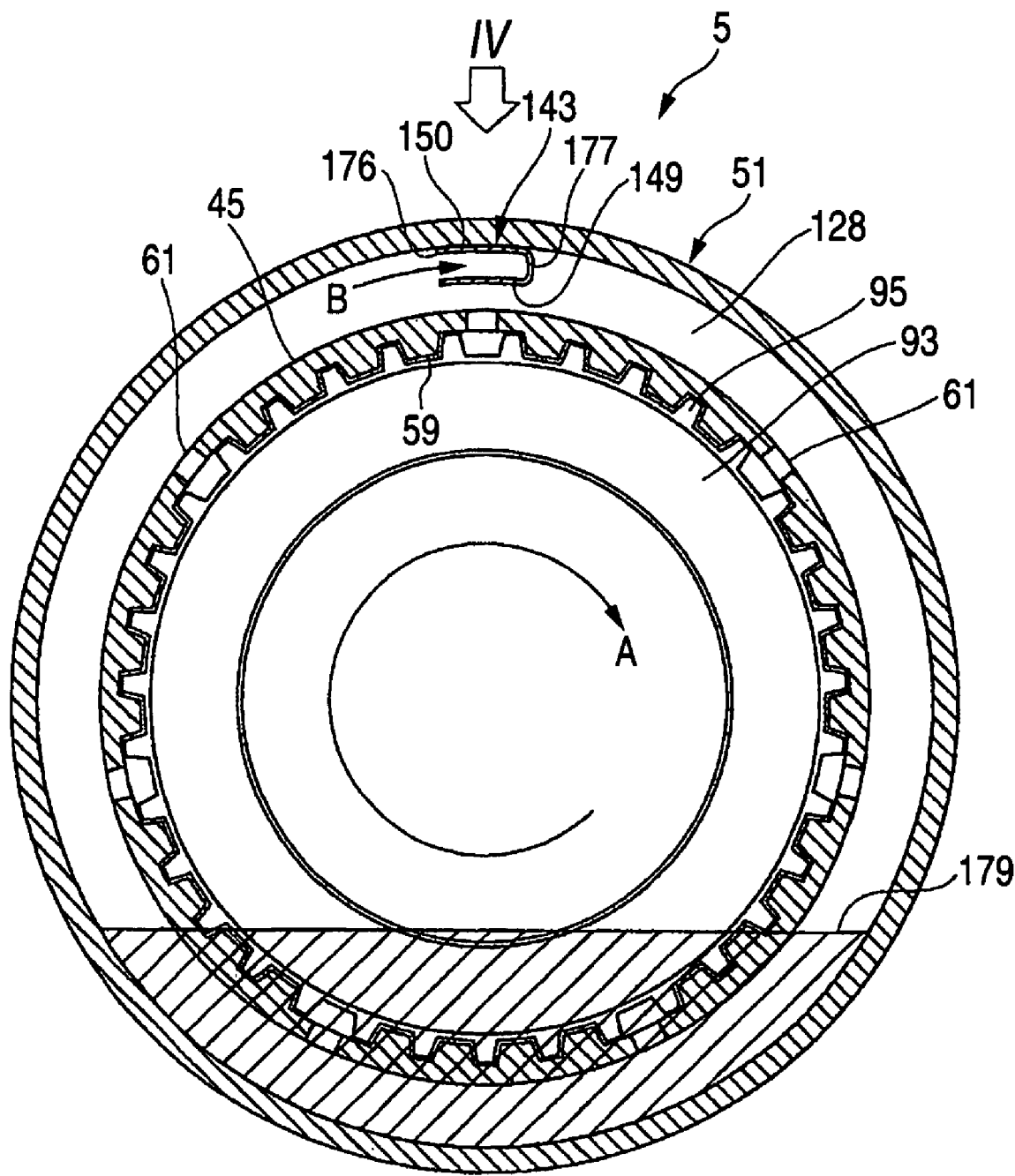
FIG. 3 is a sectional view taken along a line III-III of FIG. 2 (exemplary embodiment 1).
Figure 4:
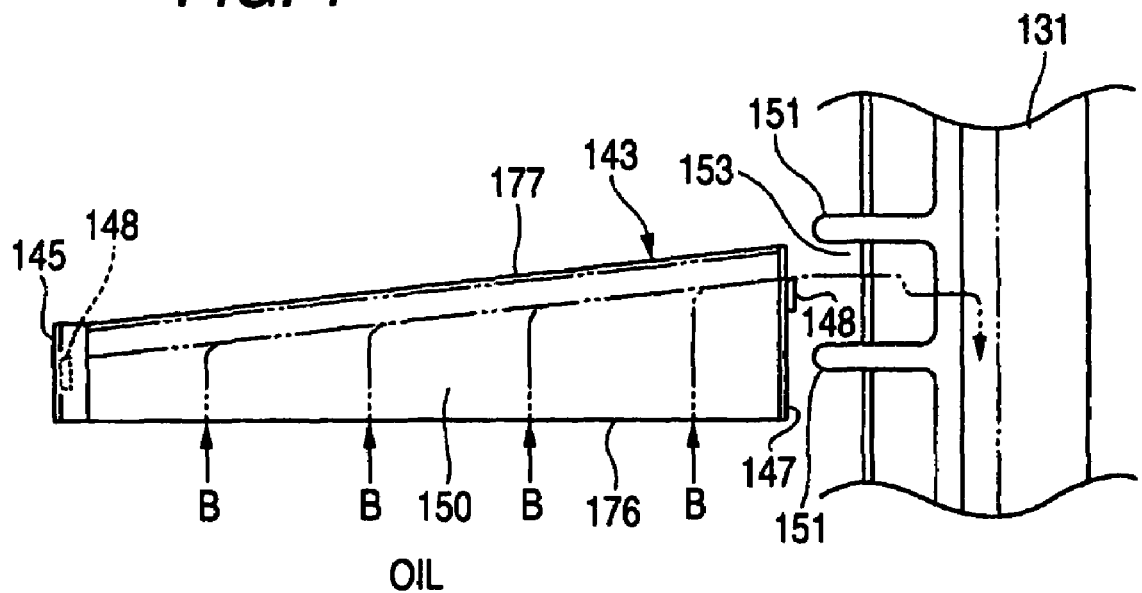
FIG. 4 is an explanatory view showing a state of attaching an oil girder viewed by a IV arrow mark direction of FIG. 3 (exemplary embodiment 1).

FIG. 3 and FIG. 4 explain the oil girder, FIG. 3 is a sectional view taken along a line III-III of FIG. 2, FIG. 4 is an explanatory view showing a state of attaching the oil girder in IV arrow mark direction of FIG. 3.

As shown by FIG. 3, the oil girder 143 is formed by a shape including an opening 176 on one side of a section thereof and including a guide wall 177 on other side thereof, bent along the inner periphery of the clutch housing 45, and attached to the inner periphery substantially in a close contact state. According to the embodiment, the opening 176 of the oil girder 143 is opposed to a direction of rotating the clutch housing 45 in an arrow mark A in a forward advancing running.

As shown by FIG. 4, an edge of the opening 176 of the oil girder 143 is arranged in parallel with the axis center of the axle 39, the guide wall 177 is formed to gradually incline such that the more on the side of the cover portion 131, the more remote from the axis center of the axle 39. Therefore, there is constructed a constitution in which the lubricating oil stirred up by rotating the clutch housing 45 and guided to the oil girder 143 is easy to move to the side of the cover portion 131 by the inclination of the guide wall 177.

[Assembling of Limited Slip Differential Mechanism]

The limited slip differential mechanism 5 of FIG. 2 is subsidiarily assembled including the coupling shaft 163 of the axle 39.

The limited slip differential mechanism 5 is arranged at a side face of the bell housing 7 as shown by FIG. 1, and a front end of the coupling shaft 163 is fitted by a spline with the side gear 21 of the differential mechanism 3. Successively, the coupling flange 137 is coupled to be fastened to the outer face of the bell housing 7.

At the coupling shaft 163, a uniform coupling 181 of the axle 39 is coupled to the coupling flange 165.

[Torque Transmission]

A torque transmitted from the engine 31 by way of the transmission 9 and transmitted from the output gear 29 to the ring gear 23 is transmitted to the left and right side gears 19, 21 by way of the pinion shaft 15, the pinion gear 17 rotated integrally with the differential case 13. The torque is transmitted from the left and right side gears 19, 21 to the left and right front wheels 33, 35 by way of the left and right axles 37, 39, and the vehicle can be run by driving the front wheels 33, 35.

When differential rotations are produced at the left and right front wheels 33, 35, the side gears 19, 21 are differentially rotated by way of the axles 27, 39 and the left and right front wheels 33, 35 are driven by transmission similar to the above-described from the engine 31 in a state of permitting the differential rotations.

[Differential Movement Limitation]

When the differential rotations of the left and right front wheels 33, 35 are limited, the clutch portion 49 is controlled to fasten by controlling to conduct electricity to the electromagnet 99 to control relative rotation between the clutch hub 47 fitted by a spline with the side of the axle 39 and the clutch housing 45 fitted by a spline with the side of the differential case 13.

Further explaining, a magnetic path is formed among the rotor 62, the support member 103, the armature 117 by controlling to conduct electricity to the electromagnet 99 in FIG. 2. By forming the magnetic path, the armature 117 is attracted to the side of the rotor 62 to fasten the pilot clutch 89. By the fastening, the cam plate 101 is engaged with the side of the clutch housing 45 in the rotational direction. On the other hand, the press plate 119 engaged by a spline with the side of the clutch hub 47 is rotationally displaced relative to the cam plate 101, and the cam ball 125 rides on the cam face. By riding on of the cam ball 125, the cam mechanism 121 is operated to generate a thrust force.

The thrust force is transmitted to the side of the rotor 62 by way of the needle bearing 123, and a moving force is operated to the press plate 119 as a reaction force thereof. By the moving force, the press plate 119 is moved to fasten the main clutch 87. The main clutch 87 restricts relative rotation between the clutch housing 45 and the clutch hub 47 in accordance with a fastening force to control relative rotation between the axle 39 and the clutch housing 45 as described above.

By controlling the relative rotation, the differential movement of the differential mechanism 3 of FIG. 1 can be limited.

[Lubrication]

The differential mechanism 3 at inside of the bell housing 7 is lubricated under a lubrication environment on the side of the transmission 9.

The side of the limited slip differential mechanism 1 is under a lubrication environment independent from that of the side of the transmission 9 and can firmly lubricate respective portions.

That is, in rotating the side of the clutch housing 45, the lubricating oil contained up to a line 179 of the support housing 51 as shown by FIG. 3 receives a rotational force by the outer peripheral face of the clutch housing 45, the lubricating oil is moved by a centrifugal force exerted to the lubricating oil by rotating the side of the clutch housing 45, and the respective portions can be lubricated.

Particularly, by rotating the clutch housing 45, the lubricating oil is guided from an outer peripheral side thereof and the oil hole 61 of FIG. 3 to the oil girder 143 as shown by an arrow mark B. The lubricating oil guided to the oil girder 143 is brought into the oil girder 143 from the opening 176 and is moved to the side of the cover portion 131 by the guide inclined by the guide wall 177 and the upper wall 150. On the side of the cover portion 131, the lubricating oil is moved from the end portion of the oil girder 143 into the guide recess portion 153 between the ribs 151 to reach the notch 113 on the lower side from the guide recess portion 153 and is moved to the space portion 115 by moving through the notch 113. Inside of the space portion 115 is stored with some degree of the lubricating oil by moving the lubricating oil from the side of the notch 113.

In differential rotation, the screw groove 66 is operated by relative rotation of the rotor 62 on the side of the clutch housing 45 and the coupling shaft 163 of the axle 35, the lubricating oil is dragged in from the space portion 115 and is guided to the groove 81 of the clutch hub 47 by moving the lubricating oil in the axial direction.

On the other hand, the lubricating oil is moved from the groove 81 in the outer peripheral direction as it is, on the other hand, the lubricating oil is moved from the notch 127 to the side of the main clutch 87 by rotating the side of the main clutch 87.

By moving the lubricating oil, the cam mechanism 121, the pilot clutch 89, the main clutch 87 and the like are lubricated.

On the side of the main clutch 87, the lubricating oil can be moved in the axial direction by the hole 97 of the inner plate 93, and the lubricating oil can be sufficiently distributed to a total of the main clutch 87.

The lubricating oil lubricating the main clutch 87, the pilot clutch 89 and the like is discharged from the oil hole 61 of the clutch housing 45 to the outer peripheral side by the centrifugal force and is guided to the oil girder 143 as described above.

Effect of Exemplary Embodiment 1

According to the exemplary embodiment 1 of the invention, the differential mechanism 3 is contained and supported at inside of the bell housing integrally provided with the transmission case 11 of the transmission 9 to constitute the common lubrication environment, the limited slip differential mechanism 5 for limiting the differential movement of the differential mechanism 3 is made to be attachable to outside of the bell housing by selective mounting, and therefore, the sufficient limited slip differential mechanism 5 can be provided without restricting the limited slip differential mechanism 5 by the size of the bell housing. Further, the limited slip differential mechanism 5 is attachable thereto by selective mounting, and therefore, the interchangeability of presence/absence of the limited slip differential mechanism 5 can be provided.

The limited slip differential mechanism 5 is subsidiarily assembled to the coupling shaft 163 of the axle 39 attachable/detachable to and from the differential mechanism 3, and therefore, when the limited slip differential mechanism 5 is not provided, the interchangeability can easily be provided by changing only the coupling shaft 163.

The limited slip differential mechanism 5 is provided with the clutch portion 49 for generating the differential movement restricting force between the clutch housing 45 and the clutch hub 47, the clutch housing 45 is provided with the spline 173 rotationally engageable to the differential case 13 of the differential mechanism 3 by being integrated by being moved in the axial direction, the clutch hub 47 is rotationally engaged with the coupling shaft 163, and therefore, the limited slip differential mechanism 5 and the differential mechanism 3 can easily be coupled by attaching the limited slip differential mechanism 5 to outside of the bell housing 7.

The support housing 51 for supporting the limited slip differential mechanism 5 attachably/detachably to and from the bell housing 7 is provided, and therefore, the limited slip differential mechanism 5 can easily and firmly be attached to the bell housing 7.

The limited slip differential mechanism 5 is made to be able to carry out the firm differential movement limiting control by a simple control since the clutch portion 49 is made to be able to control to fasten by the electromagnetic force of the externally controllable electromagnet 99.

The oil seals 141, 159, 174 for making the limited slip differential mechanism 5 the independent lubrication space are provided between the support housing 51 and the side of the coupling shaft 163 of the axle 39, and therefore, the side of the support housing 51 can be made to be independent from the side of the bell housing 7 including the lubrication environment, and the interchangeability of presence/absence of the limited slip differential mechanism 5 can further easily be provided.

The limited slip differential mechanism 5 is attached to the axle 39 of the front wheels 33, 35 of the automobile, and therefore, on the side of the front wheels 33, 35 of an FF vehicle or a 4 wheel drive vehicle of FF base, the sufficient limited slip differential mechanism 5 can be provided, further, the interchangeability of presence/absence of the limited slip differential mechanism 5 can be provided.

<Modified Example of Oil Girder>

Figure 5:
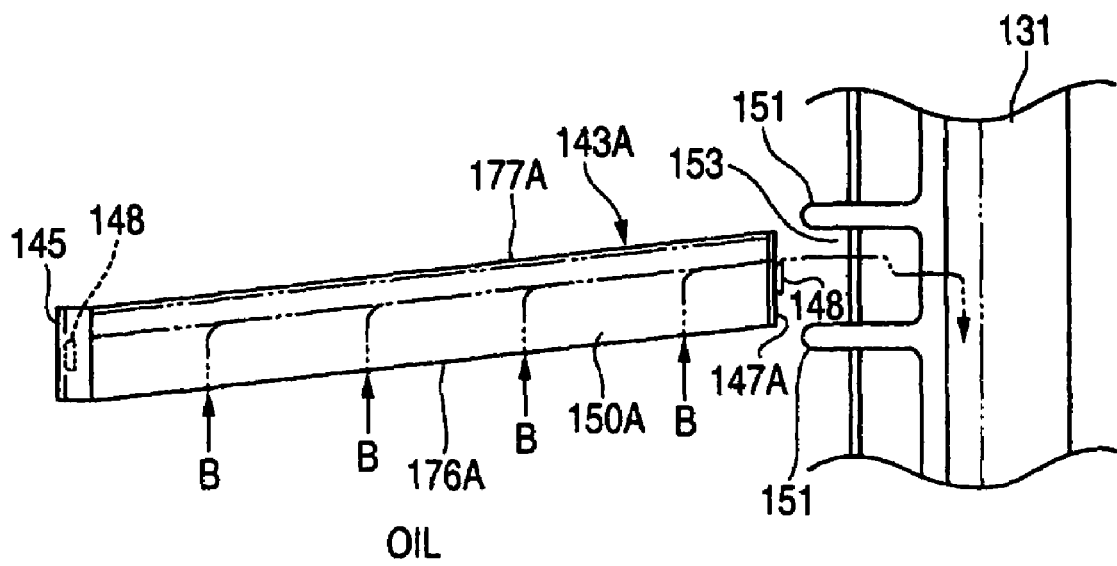
FIG. 5 is an explanatory view in correspondence with FIG. 4 related to a modified example of the oil girder (exemplary embodiment 1).

FIG. 5 is an explanatory view in correspondence with FIG. 4 related to a modified example of the oil girder.

An edge of an opening 176A of an oil girder 143A is formed to be inclined to the axis center of the axle 39 similar to a guide wall 177A.

Therefore, according to the oil girder 143A of the modified example, in comparison with the oil girder 143 of FIG. 4, light-weighted formation can be achieved.

<Other Partially Modified Example of Lubrication Structure>

Figure 6:
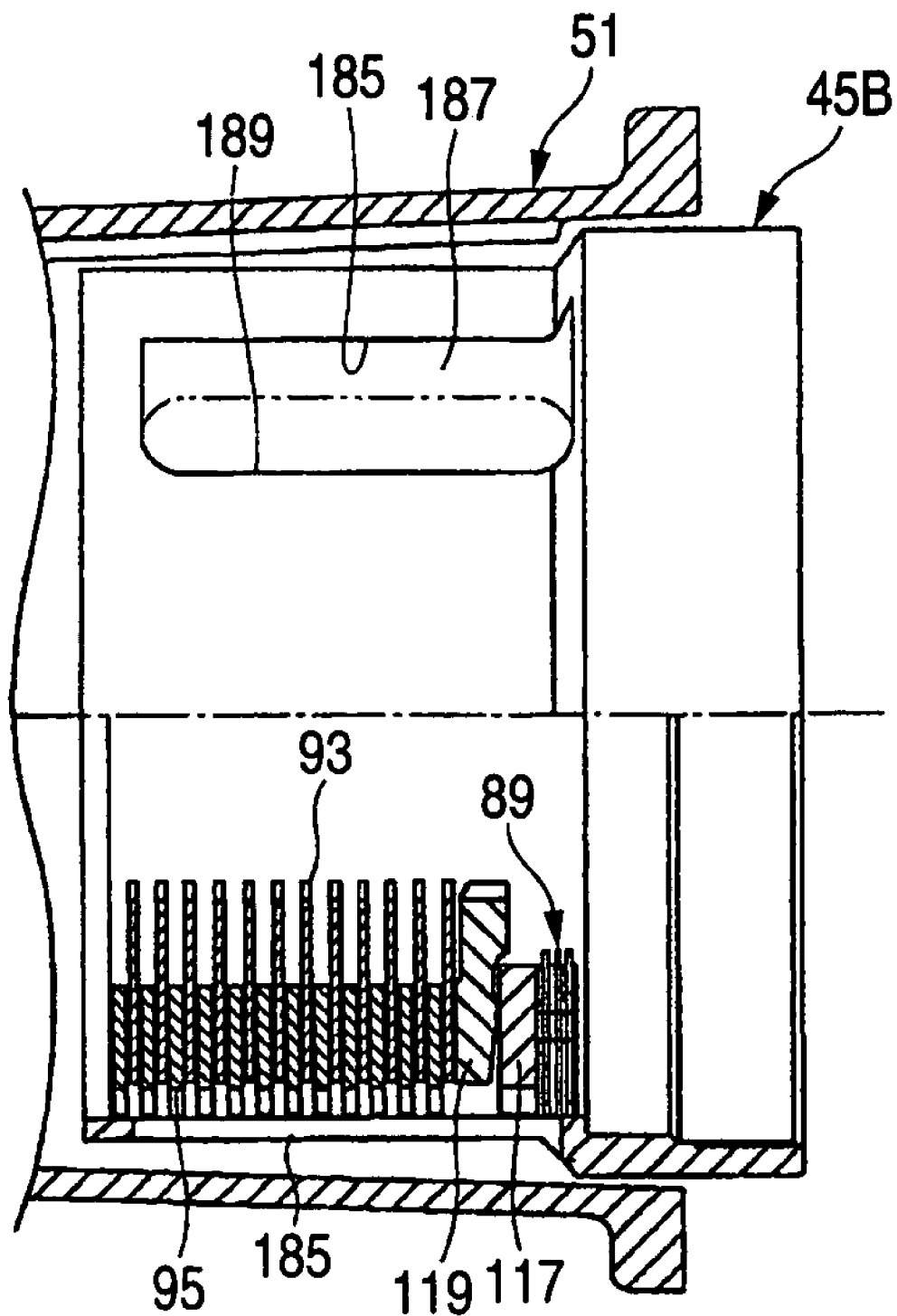
FIG. 6 is a half sectional view of an essential portion showing a partially modified example of a lubrication structure and showing an introducing hole of a clutch housing (exemplary embodiment 1).
Figure 7:
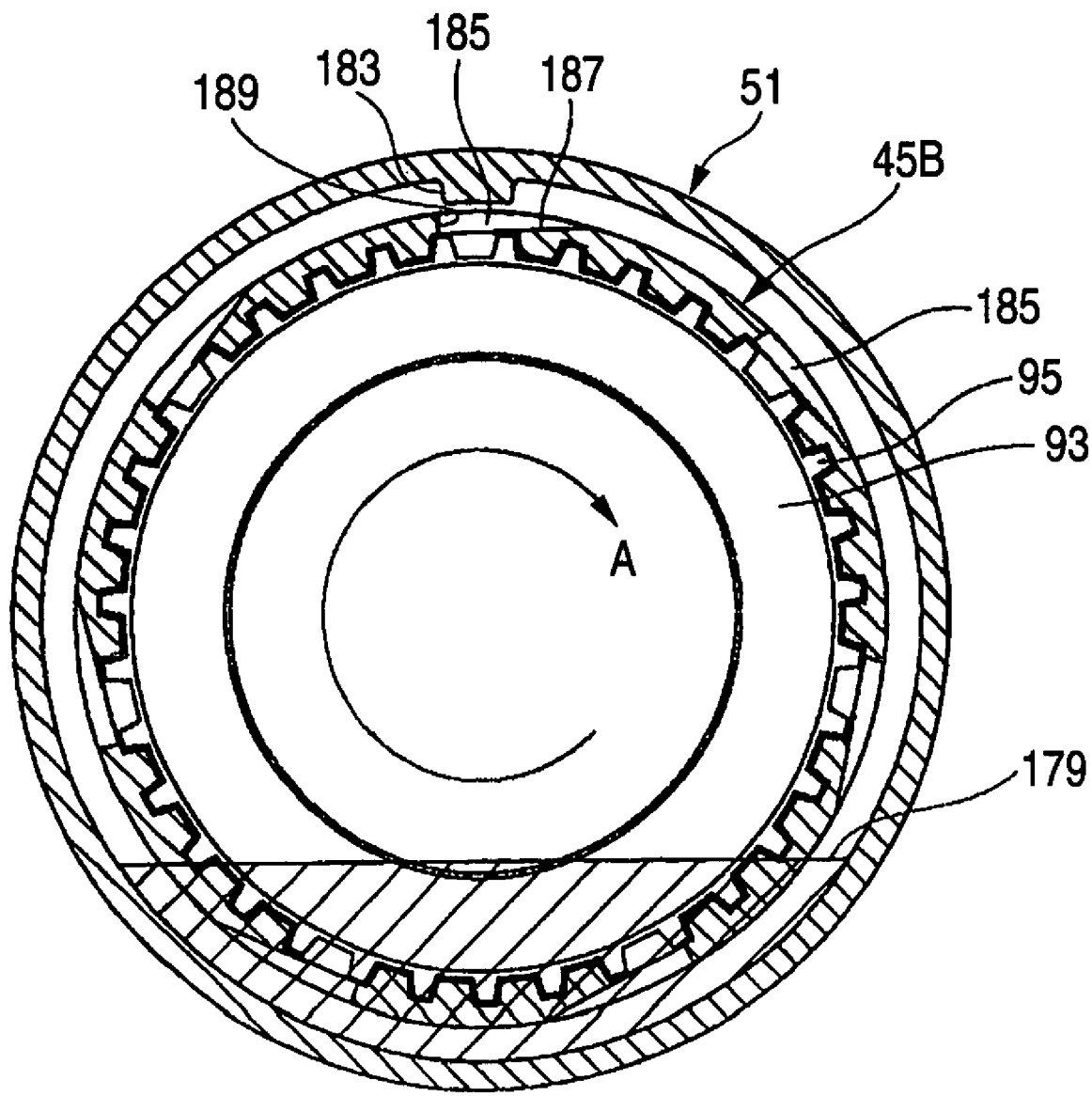
FIG. 7 is a sectional view of a limited slip differential mechanism in correspondence with FIG. 3 showing a partially modified example of a lubrication structure (exemplary embodiment 1).
Figure 8:
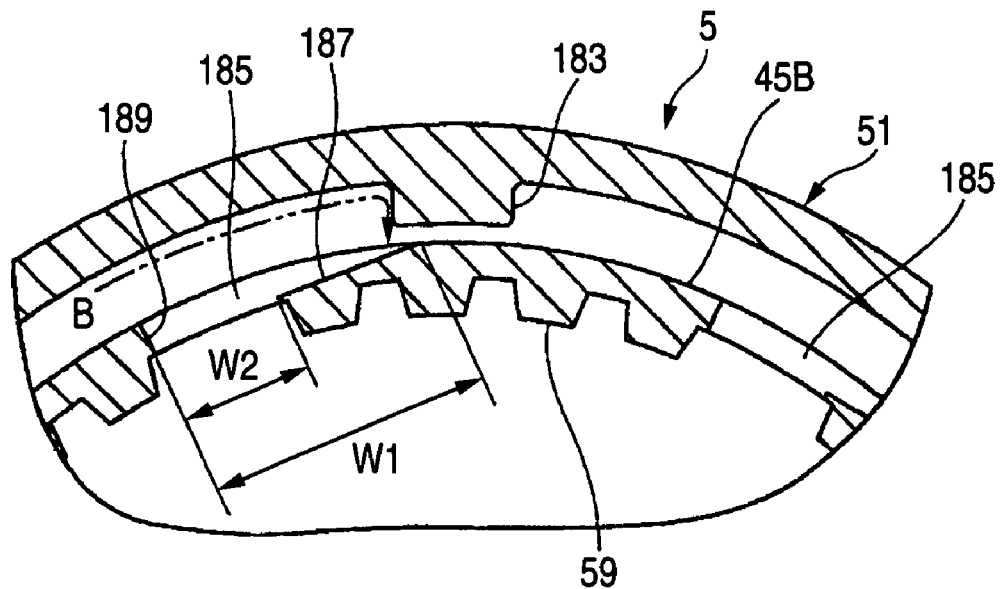
FIG. 8 is a sectional view enlarging an essential portion showing a partially modified example of a lubrication structure and showing introduction of a lubricating oil (exemplary embodiment 1).
Figure 9:
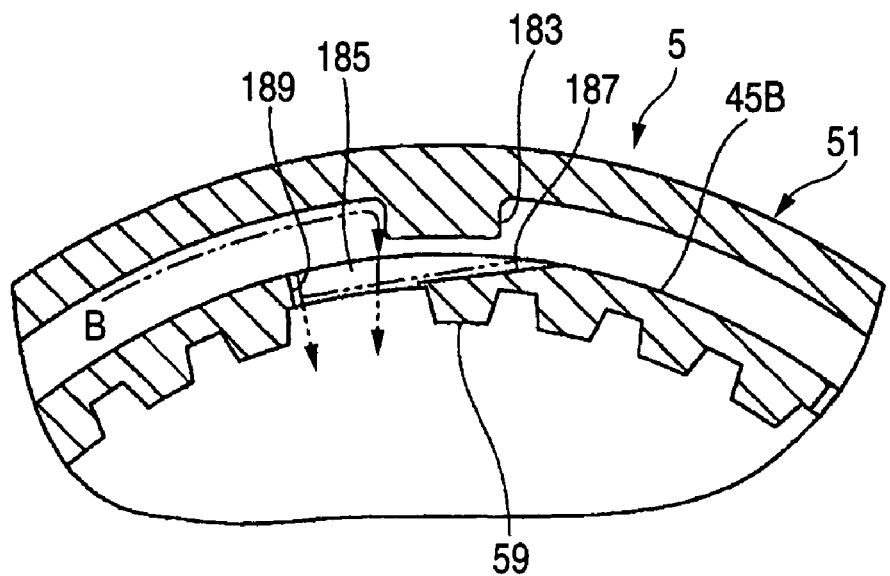
FIG. 9 is a sectional view enlarging an essential portion showing introduction of a lubricating oil when a rotational position differs from that of FIG. 8 (exemplary embodiment 1).
Figure 10:
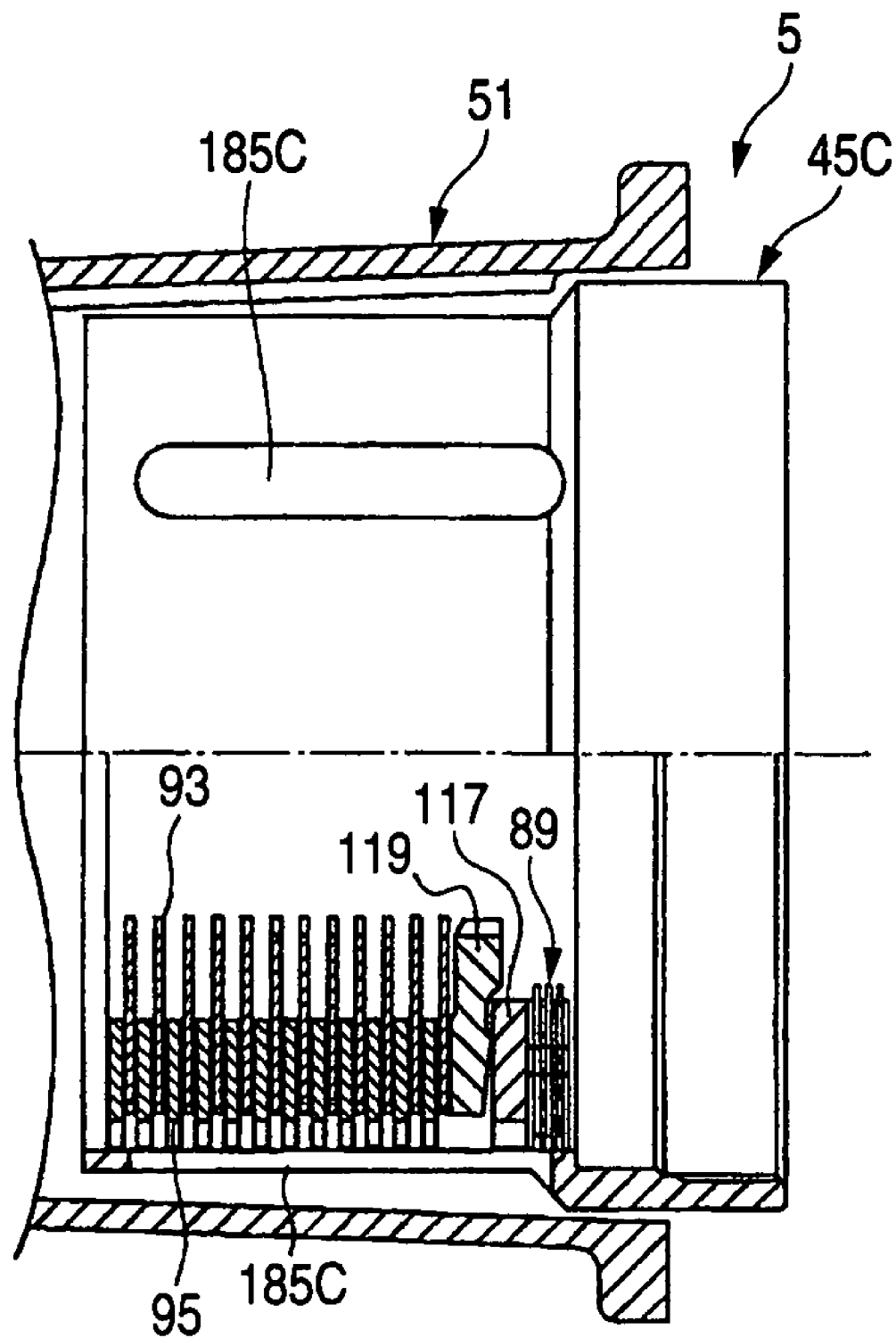
FIG. 10 is a half sectional view of an essential portion showing a partially modified example of a lubrication structure and showing an introducing hole of a clutch housing (exemplary embodiment 1).
Figure 11:
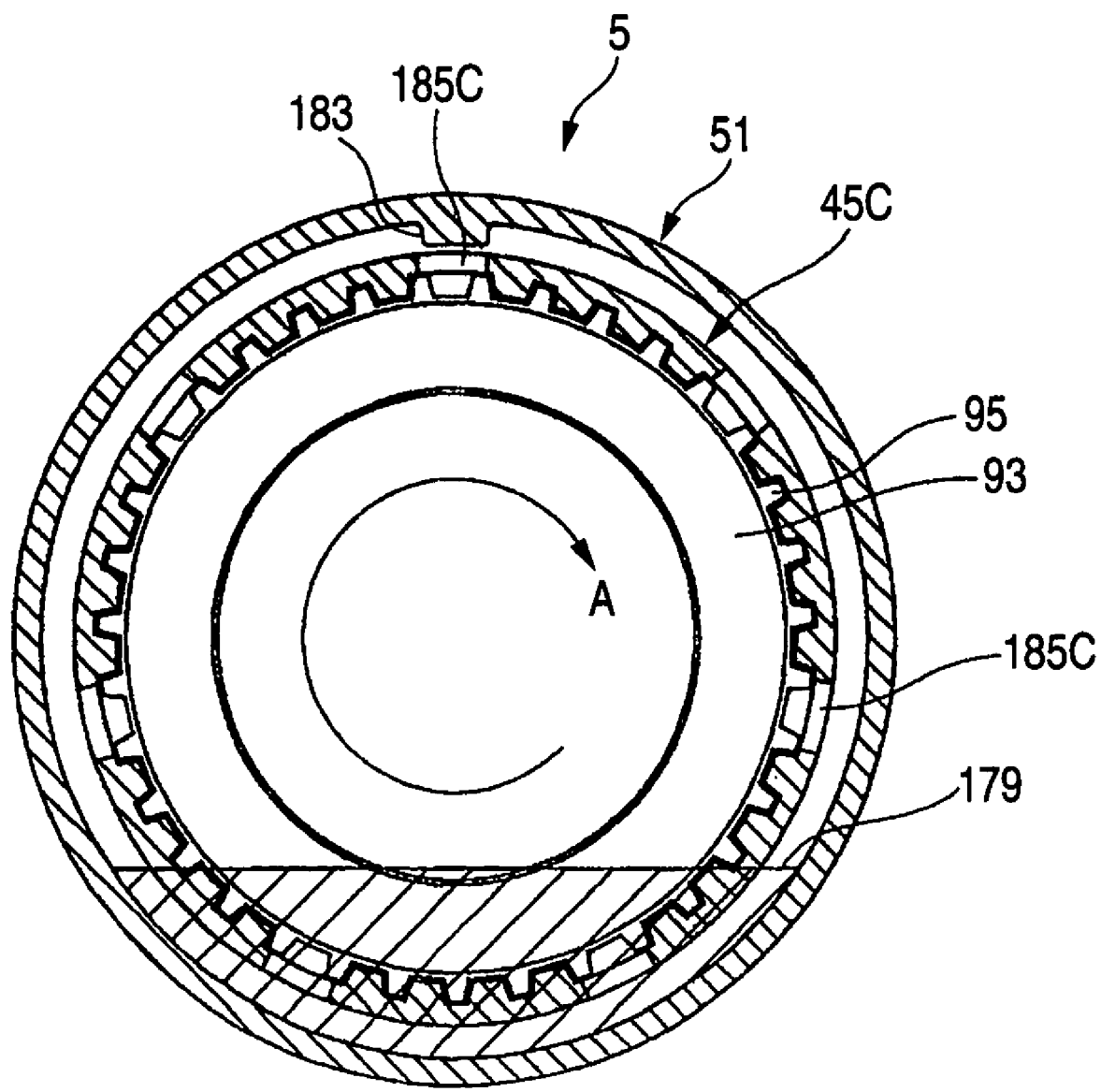
FIG. 11 is a sectional view of a limited slip differential mechanism in correspondence with FIG. 3 showing a partially modified example of a lubrication structure (exemplary embodiment 1).
Figure 12:
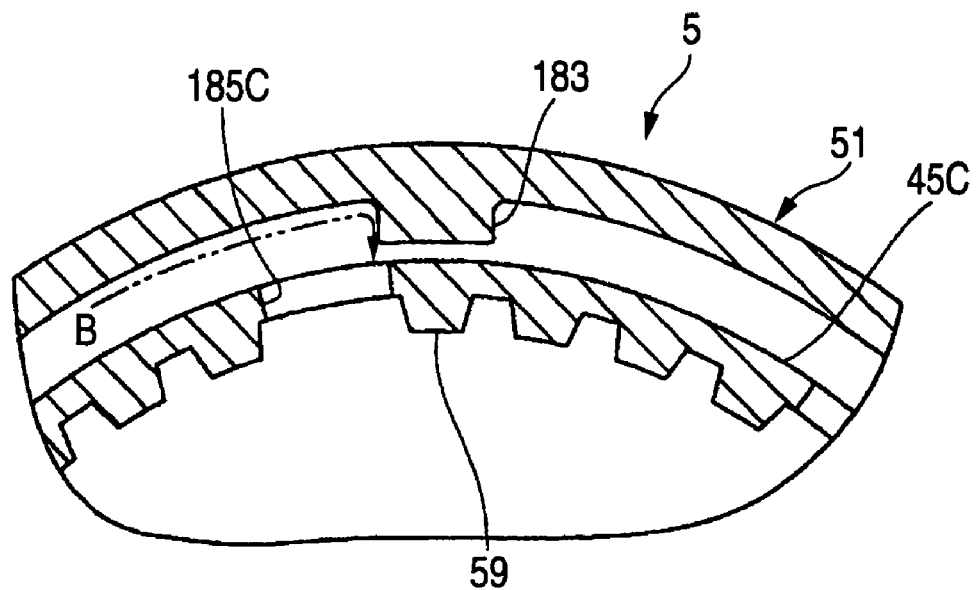
FIG. 12 is a sectional view enlarging an essential portion showing a partially modified example of a lubrication structure and showing introduction of a lubricating oil (exemplary embodiment 1).
Figure 13:
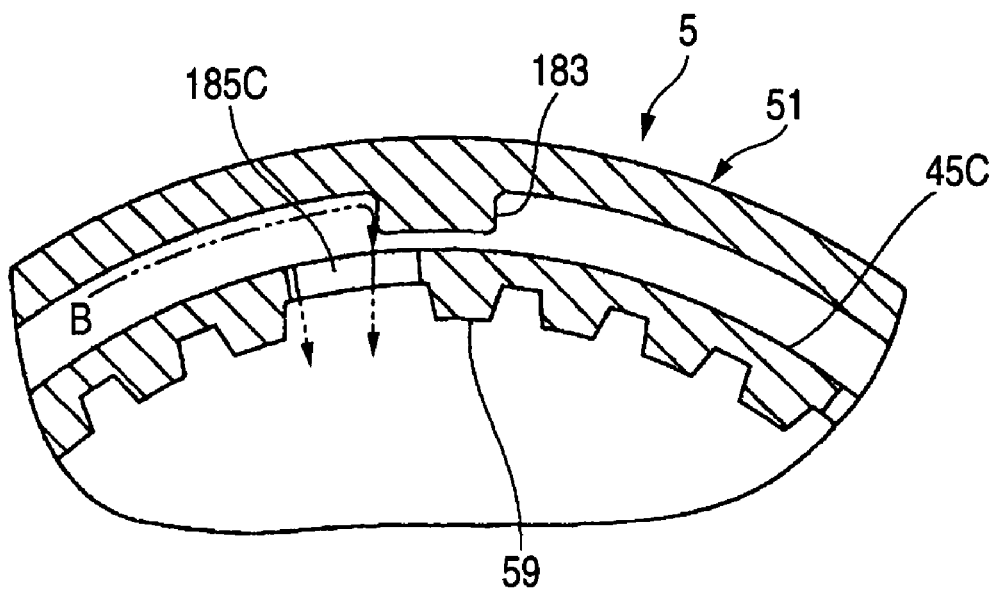
FIG. 13 is a sectional view enlarging an essential portion showing introduction of a lubricating oil when a rotational position differs from that of FIG. 12 (exemplary embodiment 1).

FIG. 6 through FIG. 13 shows a partially modified example of a lubrication structure, FIG. 6 through FIG. 9 show a first modified example, FIG. 10 through FIG. 13 show a second modified example. FIG. 6, FIG. 10 are half sectional views of essential portions showing introducing holes of the clutch housing, FIG. 7, FIG. 11 are sectional view of limited slip differential mechanisms in correspondence with FIG. 3, FIG. 8, FIG. 12 are sectional views enlarging essential portions showing introduction of the lubricating oil, FIG. 9, FIG. 13 are sectional views enlarging essential portions showing introduction of the lubricating oil when rotational positions differ from those of FIG. 8, FIG. 12.

According to the first modified example of FIG. 6 through FIG. 9, a rib 183 is extended along an axial direction at an inner face on an upper side of a support housing 51B, and a plurality of introducing holes 185 are provided at a clutch housing 45B at predetermined intervals in a peripheral direction. The introducing hole 185 is formed to be long in the axial direction and is made to be able to sufficiently introduce the lubricating oil to the main clutch 87, the pilot clutch 89 and the like.

The introducing hole 185 is provided with an inclined face 187 on a side of an outer peripheral face of the clutch housing 45B and on a front side in a rotational direction of an arrow mark A of the clutch housing 45B in running to advance, an opening width W1 on an outer peripheral face side is enlarged relative to an opening width W2 on an inner peripheral face side to constitute W1>W2. The inclined face 187 is directed to other face 189 of the introducing hole 185. For each introducing hole 185, one tooth of the inner spline 59 is deficient on an inner peripheral face side of the clutch housing 45B.

When the clutch housing 45B is rotated, the lubricating oil which is dragged to be rotated is moved to a rotational center side by being guided by the rib 183 and is guided from the introducing hole 185 into the clutch housing 45B. At this occasion, the opening widths W1, W2 of the introducing hole 185 are formed to enlarge on the outer peripheral face side to constitute W1>W2 by the inclined face 187, and therefore, in rotating the side of the clutch housing 45B, more of the lubricating oil guided by the rib 183 can be introduced. The lubricating oil introduced from the inclined face 187 is moved to the side of the other face 189 of the introducing hole 185 in accordance with rotation of the clutch housing 45B and is guided into the clutch housing 45B by being guided by the other face 189. Further, there is also the lubricating oil directly guided from the rib 183 without interposing the inclined face 187, and there is a lubricating oil directly introduced into the clutch housing 45B.

Therefore, by operation of the rib 183 and the introducing hole 185, the lubricating oil can sufficiently be introduced into the clutch housing 45B.

In FIG. 10 through FIG. 13, there is constituted an introducing hole 185C having a structure of dispensing with the inclined face 187 formed at the introducing hole 185 in FIG. 6 through FIG. 9.

Even in such a structure, the lubricating oil can sufficiently be introduced into the clutch housing 45C by the rib 183 and the introducing hole 185C.

<Modified Example of Differential Mechanism>

Figure 14:
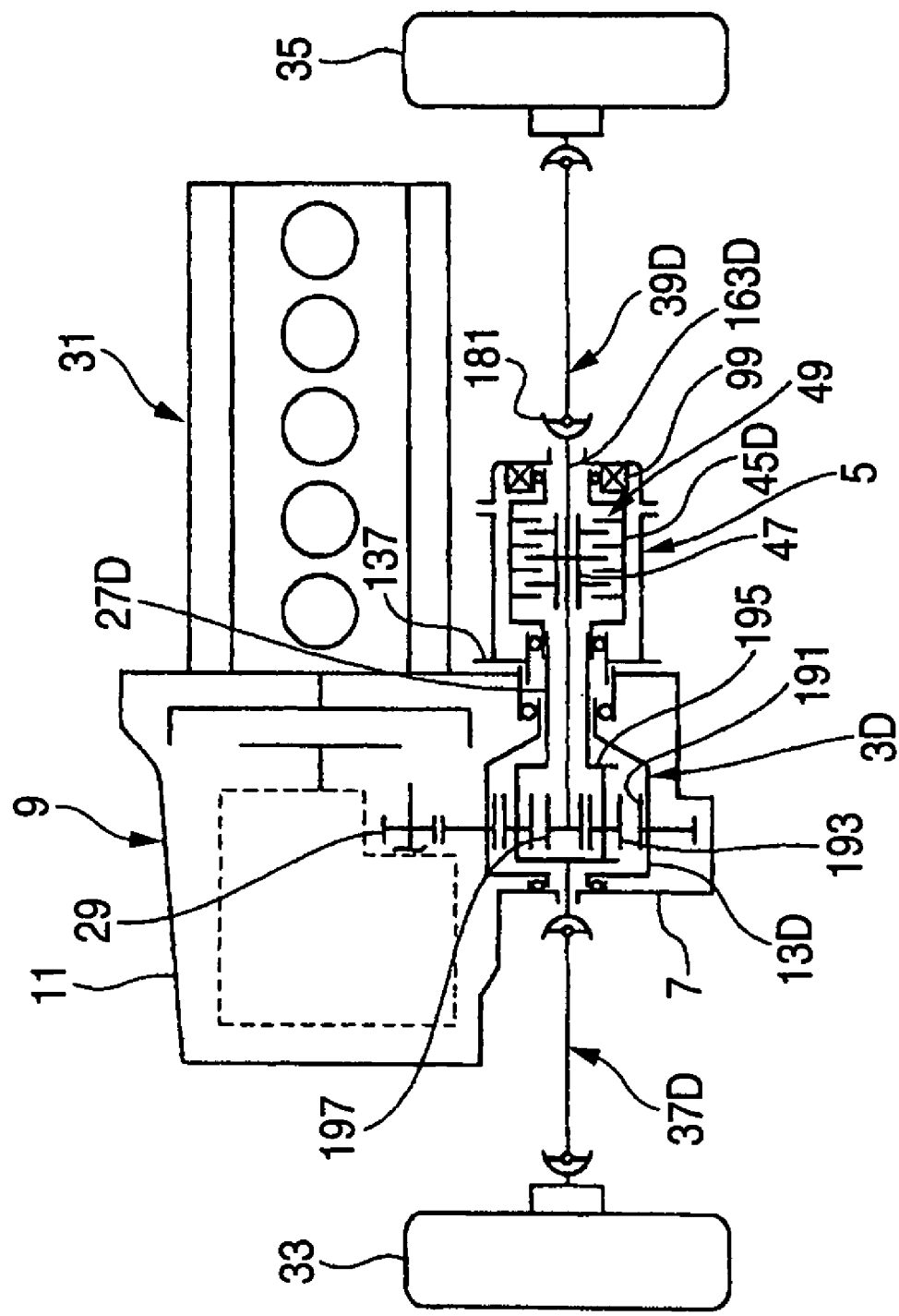
FIG. 14 is a skeleton view related to a modified example of changing a structure of a differential mechanism and showing only a front side of a transversal front engine front drive (FF) vehicle (exemplary embodiment 1).

FIG. 14 is a skeleton view related to a modified example of changing the structure of the differential mechanism and showing only a front face side of, for example, a transversal front engine front drive (FF) vehicle.

According to the modified example, a differential mechanism 3D is constituted by a planetary gear mechanism.

That is, according to the differential mechanism 3D, a differential case 13D is provided with an internal gear 191, a planetary gear 193 brought in mesh with the internal gear 191 is rotatably supported by a planetary carrier 195, and the planetary gear 93 is brought in mesh with a sun gear 197. The planetary carrier 195 is provided with a boss portion 27D, a clutch housing 45D is fitted by a spline with the boss portion 27D. The planetary carrier 195 is coupled to an axle 37D, a coupling shaft 163D of an axle 39D is fitted by a spline with the sun gear 197 and the clutch hub 47 is arranged to connect to an outer periphery of the axle 163D.

Therefore, even the differential mechanism 3D of the planetary gear mechanism is applicable similar to the differential mechanism 3 of a bevel gear type. By arranging the differential mechanism 3D of the planetary gear mechanism, the limited slip differential mechanism 5 can be arranged between the pair of axles 37D, 39D, and a drive torque can directly be transmitted between the pair of axles 37D, 39D.

Exemplary Embodiment 2

Figure 15:
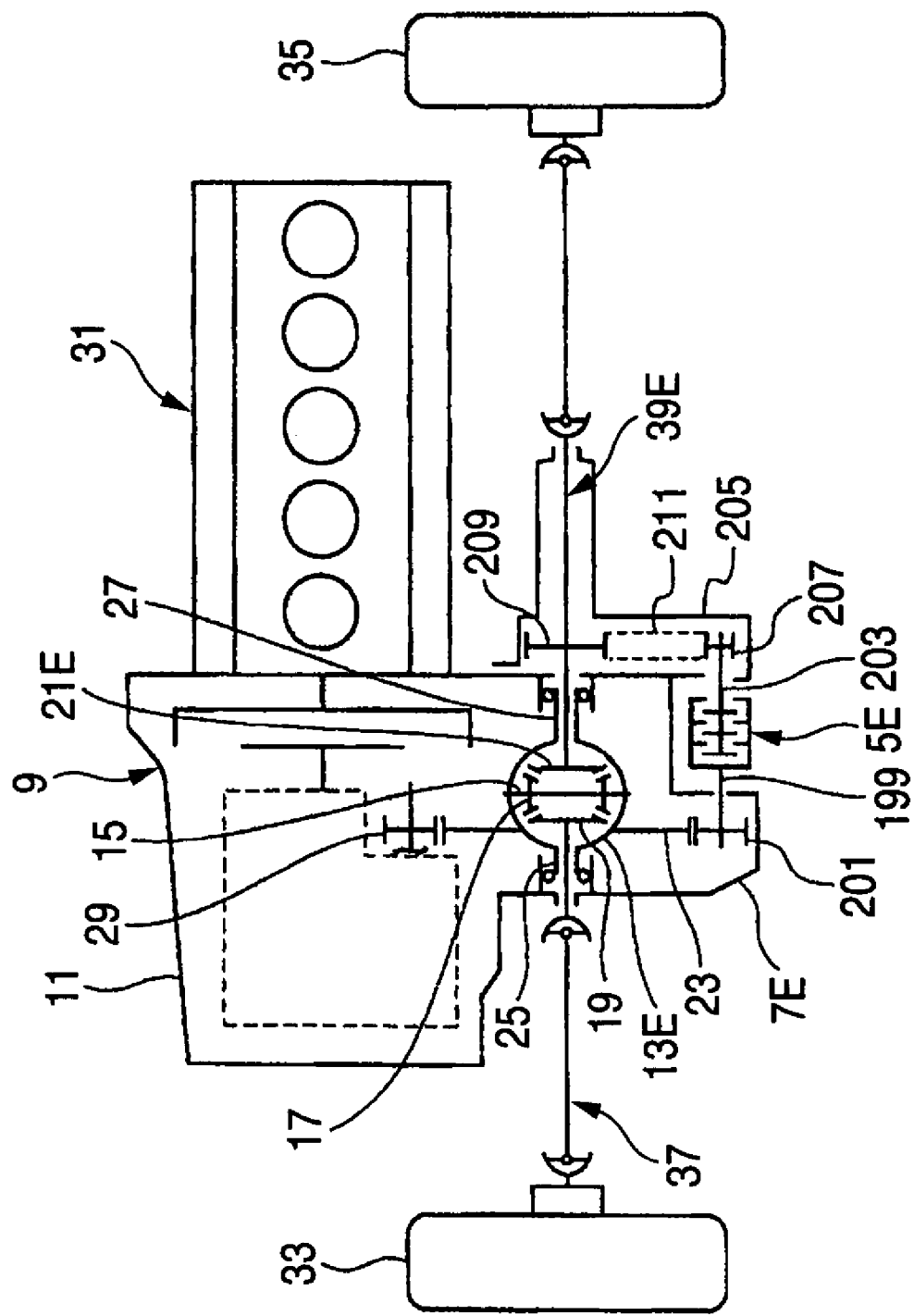
FIG. 15 is a skeleton view showing only a front wheel side of a transversal front engine front drive (FF) vehicle (exemplary embodiment 2).

FIG. 15 is a skeleton view related to an exemplary embodiment 2 of the invention and showing only a front wheel side of, for example, a transversal front engine front drive (FF) vehicle.

According to the exemplary embodiment 2, a limited slip differential mechanism 5E is arranged on a shaft different from an axle 39E constituting an output shaft and is constituted to move cooperatively with a differential case 13E of a differential mechanism 3E and the axle 39E.

That is, the limited slip differential mechanism 5E of the embodiment is constituted by a viscous coupling for generating a differential movement limiting force by a viscous resistance of a fluid. According to the limited slip differential mechanism SE, a shaft 199 on one side is coupled by a spline with a transmission gear 201 at inside of a bell housing 7E, a shaft 203 on other side is coupled to a transmitting gear 207 at inside of a transmission case 205. The transmission case is attached to an outer face of the bell housing 7E attachably/detachably thereto and therefrom by a bolt or the like. Inside of the transmission case 205 is provided with a transmitting gear 209 fitted by a spline with the axle 39E, and a transmitting chain 211 is hung around the transmitting gears 207, 209. The axle 39E is fitted by a spline with a side gear 21E of the differential mechanism 3E.

Therefore, also in the exemplary embodiment, the limited slip differential mechanism 5E for limiting differential movement of the differential mechanism 3E is made to be attachable to outside of the bell housing 7E by selective mounting and an effect similar to that of embodiment 1 can be achieved.

Further, according to the exemplary embodiment, the limited slip differential mechanism 5E can be exposed to outside, and a cooling performance can be promoted.

<Other>

Although the above-described exemplary embodiments are applied to the FF vehicle, the exemplary embodiments are applicable also to a midship vehicle, a rear engine rear drive vehicle.

As an actuator for controlling to limit differential movement, there can variously be adopted a hydraulic ring, a piston, an air diaphragm, an electric motor, a gear mechanism and the like, further, the limited slip differential mechanism per se is not limited to the friction multi plate clutch or the viscous coupling and there can variously be adopted a combination of a rotary blade and a hydraulic pump and a multi plate clutch, a magnetic fluid control and the like.

It will be apparent to those skilled in the art that various modifications and variations can be made to the described exemplary embodiments of the present invention without departing from the spirit or scope of the invention. Thus, it is intended that the present invention cover all modifications and variations of this invention consistent with the scope of the appended claims and their equivalents.

What is claimed is:

1. A power transmitting apparatus comprising:
   a differential mechanism for transmitting a torque transmitted from an engine by way of a transmission differentially rotatably to a pair of output shafts;
   a housing integrally provided to a transmission case of the transmission, wherein the differential mechanism is contained and supported at inside of the housing, and a common lubrication environment is constituted in the housing and the transmission case;
   a support housing supported by the housing; and
   a limited slip differential mechanism for limiting a differential movement of the differential mechanism and supported by the support housing;
   wherein the limited slip differential mechanism comprises:
      an inner rotating member;
      an outer rotating member; and
      a clutch portion that generates a differential movement limiting force between the inner and outer rotating members,
   wherein the outer rotating member is supported by the support housing through a pair of bearings on both sides of the clutch portion in an axial direction,
   wherein the inner rotating member is supported by the outer rotating member through a pair of bearings on both sides of the clutch portion in the axial direction, and
   wherein an inner circumferential portion of the inner rotating member and an outer circumferential portion of said one of the output shafts are connected by a spline coupling.

2. The power transmitting apparatus according to claim 1, wherein the limited slip differential mechanism is subsidiarily assembled to a side of said one of the output shafts attachable/detachable to and from the differential mechanism.

3. The power transmitting apparatus according to claim 2, wherein one of the inner and outer rotating members is provided with an engaging portion rotationally engageable with a differential case of the differential mechanism by a movement thereof in an axial direction; and
   wherein other of the inner and outer rotating members is rotationally engaged with the side of said one of the output shafts.

4. The power transmitting apparatus according to claim 1, further comprising:
   a seal for constituting an independent lubrication space of the limited slip differential mechanism and provided between the support housing and the side of said one of the output shafts.

5. The power transmitting apparatus according to claim 2, wherein the limited slip differential mechanism enables the clutch portion to be controlled to fasten by an externally controllable electromagnetic force.

6. The power transmitting apparatus according to claim 1, wherein the output shaft is an axle of a front wheel of an automobile.

* * * * *